US008543627B1

(12) United States Patent
Tucci

(10) Patent No.: US 8,543,627 B1
(45) Date of Patent: Sep. 24, 2013

(54) METHOD FOR SAMPLING PROBABILITY DISTRIBUTIONS USING A QUANTUM COMPUTER

(76) Inventor: Robert R. Tucci, Woburn, MA (US)

( * ) Notice: Subject to any disclaimer, the term of this patent is extended or adjusted under 35 U.S.C. 154(b) by 559 days.

(21) Appl. No.: 12/924,654

(22) Filed: Oct. 1, 2010

(51) Int. Cl.
*G06F 1/02* (2006.01)

(52) U.S. Cl.
USPC ............................................................ 708/274

(58) Field of Classification Search
USPC ............................................................ 708/274
See application file for complete search history.

(56) References Cited

U.S. PATENT DOCUMENTS

| | | | |
|---|---|---|---|
| 6,317,766 B1 | 11/2001 | Grover | |
| 6,456,994 B1* | 9/2002 | Tucci | 706/52 |
| 7,028,275 B1 | 4/2006 | Chen et al. | |
| 7,383,235 B1* | 6/2008 | Ulyanov et al. | 706/13 |
| 2003/0169041 A1* | 9/2003 | Coury et al. | 324/307 |
| 2004/0130956 A1* | 7/2004 | Porto et al. | 365/200 |
| 2004/0162640 A1* | 8/2004 | Branciforte et al. | 700/262 |
| 2007/0266347 A1* | 11/2007 | Chang et al. | 716/3 |
| 2009/0259905 A1* | 10/2009 | Silva et al. | 714/746 |
| 2012/0210111 A1* | 8/2012 | Ozols et al. | 713/1 |

OTHER PUBLICATIONS http://en.wikipedia.org/wiki/Bayesian\_network.
"Rapid Sampling Through Quantum Computing" by Lov Grover, arXiv:quant-ph/9912001.
http://en.wikipedia.org/wiki/Grover's\_algorithm.
"Quantum Simulated Annealing" by R. Somma, S. Boixo, H. Barnum, arXiv:0712.1008.
"Speed-up via Quantum Sampling" by Pawel Wocjan, Anura Abeyesinghe, arXiv:0804.4259.
"A Different Kind of Quantum Search" by Lov Grover, arXiv:quant-ph/0503205.
"Code Generator for Quantum Simulated Annealing" by R.R. Tucci, arXiv:0908.1633.
"Quantum Gibbs Sampling Using Szegedy Operators" by R.R. Tucci, arXiv:0910.1647.
"An Adaptive, Fixed-Point Version of Grover's Algorithm" by R.R. Tucci, arXiv:1001.5200.
"Quibbs, a Code Generator for Quantum Gibbs Sampling" by R.R. Tucci, arXiv:1004.2205.

* cited by examiner

*Primary Examiner* — Tan V. Mai

(57) ABSTRACT

We describe a method for using a classical computer to generate a sequence of elementary operation (SEO) that can be used to operate a quantum computer, thereby inducing the quantum computer to sample an arbitrary probability distribution. The probability distribution being sampled is specified in the form of a Bayesian network.

25 Claims, 12 Drawing Sheets

Figure 2

$|Fin\rangle = \tilde{R}_{beg}^{(N_{ste})} \tilde{R}_{tar} \cdots \tilde{R}_{beg}^{(2)} \tilde{R}_{tar} \, \tilde{R}_{beg}^{(1)} \tilde{R}_{tar} \, \tilde{R}_{beg}^{(0)} \tilde{R}_{tar} \begin{array}{l} -|0^{ac}\rangle \\ -|0^{N_B}\rangle \\ -|x_0\rangle \end{array}$ 201

$\tilde{R}_{beg}^{(j)} = \begin{array}{l} ---\;ac\text{ qubits} \\ R_{beg}^{(j)} - N_B \text{ qubits} \\ \phantom{R_{beg}^{(j)}} - N_B \text{ qubits} \end{array}$ 202

$\tilde{R}_{tar} \approx \begin{array}{l} ---\;ac\text{ qubits} \\ R_{tar} - N_B \text{ qubits} \\ \phantom{R_{tar}} - N_B \text{ qubits} \end{array}$ 203

$R_{beg}^{(j)} = \exp(i\,\alpha_j |s'\rangle\langle s'|)$     204

$R_{tar} = \exp(i\,\Delta\lambda |t\rangle\langle t|)$     205

$|s'\rangle = \begin{array}{l} -|0^{N_B}\rangle \\ -|x_0\rangle \end{array}$ 206     $|t\rangle = \begin{array}{l} -|0^{N_B}\rangle \\ -|\sqrt{\pi}\rangle \end{array}$ 207

$|\sqrt{\pi}\rangle = \sum_x \sqrt{\pi(x)}\,|x\rangle$     208

$e^{i\alpha}|Fin\rangle \approx \begin{array}{l} -|0^{ac}\rangle \\ -|0^{N_B}\rangle \\ -|\sqrt{\pi}\rangle \end{array}$     209

Figure 3
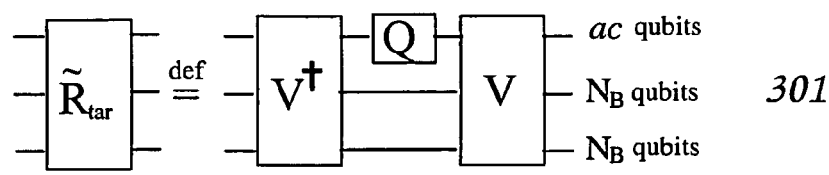
$$Q = \exp(i\Delta\lambda |0^{ac}\rangle\langle 0^{ac}|) \qquad 302$$
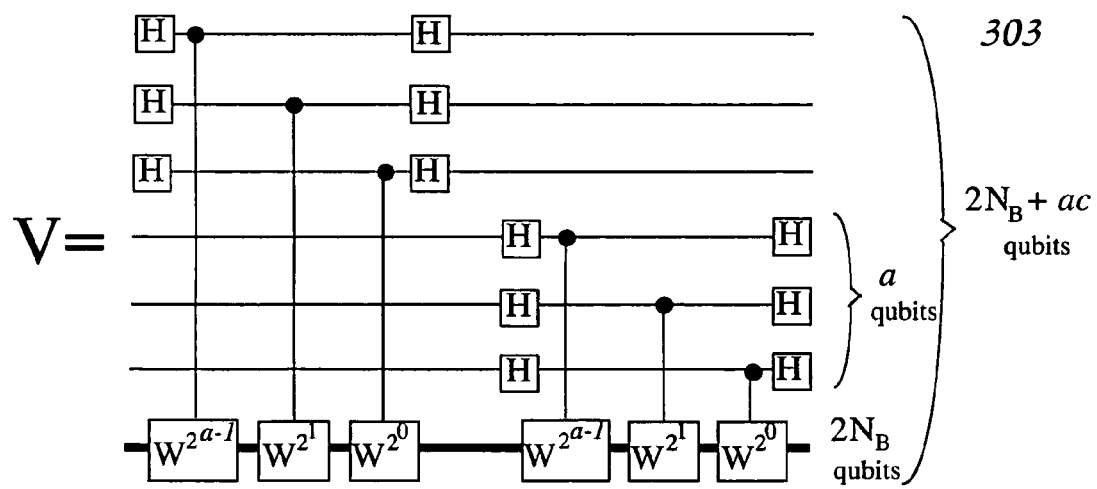

Figure 4

$$W = U \, (-1)^{\check{\pi}} \, U^\dagger \, (-1)^{\hat{\pi}} \quad 401$$

$$\check{\pi} = \overline{|0^{N_B}\rangle\langle 0^{N_B}|}^{\;N_B \text{ qubits}} \quad 402$$

$$\hat{\pi} = \underline{|0^{N_B}\rangle\langle 0^{N_B}|}_{\;N_B \text{ qubits}} \quad 403$$

For $j, k = 0, 1, 2, \ldots, 2^{N_B} - 1$ $$\begin{matrix}\langle 0 | \\ \langle m_k |\end{matrix} U \begin{matrix}|m_j\rangle \\ | 0 \rangle\end{matrix} = m_j \delta_k^j \quad 404$$

$$M_{hyb} |m_j\rangle = m_j |m_j\rangle \quad 405$$

*Figure 5*

$$\langle y|M_{hyb}|x\rangle = M_{hyb}(y|x) = \Lambda_2(x|y)\Lambda_1(y|x) \quad 501$$

$$\Lambda_q(y|x) = \sqrt{M_q(y|x)} \quad \text{for } q = 1, 2 \quad 502$$

If $\quad x = (x_1, x_2, x_3) \quad , \quad y = (y_1, y_2, y_3)$ $M_1(y|x) =$ $$\underset{\underline{x}_1|\underline{x}_2\underline{x}_3}{P(y_1|x_2, x_3)} \underset{\underline{x}_2|\underline{x}_3\underline{x}_1}{P(y_2|x_3, y_1)} \underset{\underline{x}_3|\underline{x}_1\underline{x}_2}{P(y_3|y_1, y_2)} \quad 503$$

$M_2(y|x) =$ $$\underset{\underline{x}_1|\underline{x}_2\underline{x}_3}{P(y_1|y_2, y_3)} \underset{\underline{x}_2|\underline{x}_3\underline{x}_1}{P(y_2|y_3, x_1)} \underset{\underline{x}_3|\underline{x}_1\underline{x}_2}{P(y_3|x_1, x_2)} \quad 504$$

Figure 9

```
😐 😐 😐  📄 probs.txt
#    A
a1   0.2
a2   0.3
a3   0.5
#    B
b1   a1   c1   0.7
b2   a1   c1   0.3
b1   a2   c1   0.4
b2   a2   c1   0.6
b1   a3   c1   0.1
b2   a3   c1   0.9
b1   a1   c2   0.9
b2   a1   c2   0.1
b1   a2   c2   0.5
b2   a2   c2   0.5
b1   a3   c2   0.5
b2   a3   c2   0.5
#    C
c1   0.65
c2   0.35
```

Figure 10

```
quibbs_log.txt
Inputs:
I/O Folder = 3nodes/
Starting State:
A:      a2(01)1
B:      b2(1)1
C:      c1(0)0
Number Of Probe Bits (for each PE step) = 3
Number Of Phase Estimation (PE) Steps = 3
Maximum Number of Grover Steps = 10
Gamma Tolerance (degs) = 0.5
Delta Lambda (degs) = 150.000000000000003

Outputs:
3nodes/quibbs_eng.txt
3nodes/quibbs_pic.txt
3nodes/quibbs_log.txt
Starting Gamma (degs) = 139.99603866314905
Prob. of Starting State = 0.11699999999999999
Number of Qubits = 17
Number of Elem. Ops. = 8734
```

Figure 11

```
                                    quibbs_eng.txt
 1   HADZ    AT  6
 2   HADZ    AT  7
 3   HADZ    AT  8
 4   LOOP    3    REPS:   1
 5   PHAS    180.0   AT   13   IF   12F 11F 10F 9F   8T
 6   MP_Y    AT  12   IF   15(0      14(1      13(2      8T      BY   -39.76
 7   MP_Y    AT  11   IF   14(0      13(1      12(2      8T      BY   -33.21
 8   MP_Y    AT  10   IF   13(0      12(1      11(2      8T      BY   -30.86
 9   MP_Y    AT   9   IF   12(0      11(1      10(2      8T      BY   -42.79
10   MP_Y    AT  16   IF   15(2      14(1      13(0      8T      BY    39.762
11   MP_Y    AT  15   IF   14(2      13(1      12(0      8T      BY    33.210
12   MP_Y    AT  14   IF   13(2      12(1      11(0      8T      BY    30.863
13   MP_Y    AT  13   IF   12(2      11(1      10(0      8T      BY    42.794
14   PHAS    180.0   AT   12   IF   16F 15F 14F 13F   8T
15   MP_Y    AT  13   IF   12(2      11(1      10(0      8T      BY   -42.79
16   MP_Y    AT  14   IF   13(2      12(1      11(0      8T      BY   -30.86
17   MP_Y    AT  15   IF   14(2      13(1      12(0      8T      BY   -33.21
18   MP_Y    AT  16   IF   15(2      14(1      13(0      8T      BY   -39.76
```

Figure 12

```
                                    quibbs_pic.txt
 1   |    |    |    |    |    |    |    |    H    |    |    |    |    |    |
 2   |    |    |    |    |    |    |    H    |    |    |    |    |    |    |
 3   |    |    |    |    |    |    H    |    |    |    |    |    |    |    |
 4   LOOP    3   REPS:   1
 5   |    |    Ph--0---0---0---0---@    |    |    |    |    |    |    |    |
 6   |   (0--(1--(2--Ry--+---+---+---@  |    |    |    |    |    |    |    |
 7   |    |  (0--(1--(2--Ry--+---+---@   |    |    |    |    |    |    |    |
 8   |    |    (0--(1--(2--Ry--+---@    |    |    |    |    |    |    |    |
 9   |    |    |   (0--(1--(2--Ry--@    |    |    |    |    |    |    |    |
10   Ry--(2--(1--(0--+---+---+---+---@  |    |    |    |    |    |    |    |
11   |   Ry--(2--(1--(0--+---+---+---@  |    |    |    |    |    |    |    |
12   |    |   Ry--(2--(1--(0--+---+---@ |    |    |    |    |    |    |    |
13   |    |    |   Ry--(2--(1--(0--+---@|    |    |    |    |    |    |    |
14   0---0---0---0---Ph--+---+---+---@  |    |    |    |    |    |    |    |
15   |    |    |   Ry--(2--(1--(0--+---@|    |    |    |    |    |    |    |
16   |    |   Ry--(2--(1--(0--+---+---@ |    |    |    |    |    |    |    |
17   |   Ry--(2--(1--(0--+---+---+---@  |    |    |    |    |    |    |    |
```

METHOD FOR SAMPLING PROBABILITY DISTRIBUTIONS USING A QUANTUM COMPUTER

CROSS REFERENCES TO RELATED APPLICATIONS

Not Applicable

STATEMENT REGARDING FEDERALLY SPONSORED RESEARCH AND DEVELOPMENT

Not Applicable

REFERENCE TO COMPUTER PROGRAM LISTING

A computer program listing appendix contained in a single compact disc (CD) is included herewith and incorporated by reference herein. The CD is in IBM-PC format and was burned with a computer running the Windows 98 operating system. The CD contains a single file titled quibbs1-4.txt, in ASCII format, of size 512 KBytes, burnt onto the CD on Sep. 27, 2010.

BACKGROUND OF THE INVENTION (A) Field of the Invention

The invention relates to a quantum computer; that is, an array of quantum bits (called qubits). More specifically, it relates to methods for using a classical computer to generate a sequence of operations that can be used to operate a quantum computer. The invention also relates to methods for sampling a probability distribution and classical probabilistic networks (called classical Bayesian networks).

(B) Description of Related Art

Henceforth, we will allude to certain references by codes. Here is a list of codes and the references they will stand for.

Ref.BNets is http://en.wikipedia.org/wiki/Bayesian_network

Ref.GSamp is "Rapid Sampling Through Quantum Computing" by Lov Grover, ariv:quant-ph/9912001

Ref.GPat is "Fast Quantum Mechanical Algorithms", U.S. Pat. No. 6,317,766, by Lov K. Grover Ref.GWiki is http://en.wikipedia.org/wiki/Grover's_algorithm Ref.TexasPat is "Quantum Circuit Design for Grover's Algorithm", U.S. Pat. No. 7,028,275, by G. Chen, Z. Diao, M. Zubairy Ref.Som is "Quantum Simulated Annealing" by R. Somma, S. Boixo, H. Barnum, arXiv:0712.1008

Ref.Woc is "Speed-up via Quantum Sampling" by Pawel Wocjan, Anura Abeyesinghe, arXiv:0804.4259

Ref.GPi/3 is "A Different Kind of Quantum Search" by Lov Grover, arXiv:quant-ph/0503205

Ref.TucQusann is "Code Generator for Quantum Simulated Annealing" by R. R. Tucci, arXiv:0908.1633

Ref.TucQuibbs1 is "Quantum Gibbs Sampling Using Szegedy Operators" by R. R. Tucci, arXiv:0910.1647

Ref.TucAfga is "An Adaptive, Fixed-Point Version of Grover's Algorithm" by R. R. Tucci, arXiv:1001.5200.

Ref.TucQuibbs2 is "Quibbs, a Code Generator for Quantum Gibbs Sampling" by R. R. Tucci, arXiv:1004.2205

This invention deals with quantum computing. A quantum computer is an array of quantum bits (qubits) together with some hardware for manipulating those qubits. Quantum computers with several hundred qubits have not been built yet. However, once they are built, it is expected that they will perform certain calculations much faster that classical computers. A quantum computer follows a sequence of elementary operations. The operations are elementary in the sense that they act on only a few qubits (usually 1, 2 or 3) at a time. Henceforth, we will sometimes refer to sequences as products and to operations as operators, instructions, steps or gates. Furthermore, we will abbreviate the phrase "sequence of elementary operations" by "SEO". SEOs are often represented as quantum circuits. In the quantum computing literature, the term "quantum algorithm" usually means a SEO for quantum computers for performing a desired calculation. Some quantum algorithms have become standard, such as those due to Deutsch-Jozsa, Shor and Grover. One can find on the Internet many excellent expositions on quantum computing.

This invention also deals with sampling a probability distribution. Given a probability distribution $P_{\underline{x}}(\,)$ defined for all points x in some domain val($\underline{x}$), sampling $P_{\underline{x}}(\,)$ means obtaining a collection $\{x^{(1)}, x^{(2)}, \ldots, x^{(N_{sam})}\}$ of points in val($\underline{x}$) which are distributed according to $P_{\underline{x}}(\,)$. If one can obtain such a collection of points, one can use it to evaluate approximately the expected value of any function defined on val($\underline{x}$). Hence, sampling a probability distribution is very useful. If the points $x \in$ val($\underline{x}$) have dim($\underline{x}$) components, and dim($\underline{x}$) is very high, then sampling $P_{\underline{x}}(\,)$ becomes very difficult. The reason is that the majority of the sample points $x^{(j)}$ will come from those regions of val($\underline{x}$) where $P_{\underline{x}}(\,)$ is high, but finding those regions requires that we explore the entire set val($\underline{x}$). When dim($\underline{x}$) is high, set val($\underline{x}$) is huge, because its volume grows exponentially with dim($\underline{x}$).

The preferred embodiment of this invention uses a Bayesian network to specify $P_{\underline{x}}(\,)$. Bayesian networks are described, for example, in Ref.BNets.

There are several standard techniques for sampling probability distributions using a classical computer (for instance, Monte Carlo techniques like Gibbs sampling and Metropolis-Hastings sampling). This invention differs from those standard techniques in that we propose using a quantum computer to generate the sample of points. This is an exciting possibility to the inventor Tucci for the following reasons. Quantum computers use quantum mechanics, which has probabilities built into it, so doing Monte Carlo tricks should come natural to a quantum computer. Furthermore, systems in a quantum mechanical state have a knack for being in many places at once, so one suspects that quantum computers can explore large spaces like val($\underline{x}$) much faster than classical computers can.

Grover in Ref.GSamp seems to have been the first to propose a method for sampling probability distributions using a quantum computer. Let us call his method GSamp for short. In a nutshell, GSamp applies the so called Grover's "search" Algorithm (the one discussed in Ref.GPat and Ref.GWiki) to $N_B+1$ qubits, using the starting state $$|s'\rangle = |0^{N_B}\rangle \otimes |0\rangle$$

and the target state $$|t\rangle = \frac{1}{\sqrt{2^{N_B}}} \sum_x |x\rangle \otimes \left( \sqrt{P_{\underline{x}}(x)}\,|0\rangle + \sqrt{1 - P_{\underline{x}}(x)}\,|1\rangle \right),$$

where the sum is over all $x \in \{0,1\}^{N_B}$. Once this starting state is driven into this target state, one measures the target state to sample $P_{\underline{x}}(x)$. A serious defect of GSamp is that its target state is useless for sampling $P_x(x)$, because it has a vanishingly small amplitude of size $O(1/\sqrt{2^{N_B}})$ for all x. The preferred embodiment of this invention, which we call Quibbs, does not suffer from this defect because its target state is $$|t\rangle = \sum_x \sqrt{P_x(x)} |x\rangle \otimes |0\rangle.$$

Thus, Quibbs' target state has a finite amplitude at those x for which $P_x(x)$ is finite.

Some previous patents (see Ref.GPat and Ref.TexasPat) use Grover's search algorithm, but they do not mention in their claims or specification its use for sampling a probability distribution.

Beside Ref.GSamp, Ref.Som and Ref.Woc have also given methods for sampling probability distributions with a quantum computer. Ref.Som uses the quantum Zeno effect, whereas Ref.Woc uses Grover's pi/3 algorithm (the one in Ref.GPi/3). The present invention uses neither the quantum Zeno effect, nor Grover's pi/3 algorithm. It uses more efficient techniques instead.

Ref.Som and Ref.Woc are both concerned with optimization (via simulated annealing) of a non-negative function E(x) defined for all x, whereas the present invention is concerned with sampling an arbitrary probability distribution $P_x(x)$. Even though optimization and sampling are related and share some common techniques, they are not the same thing. For instance, sampling allows you to find the expected value of any function of x, whereas optimization doesn't. Optimization allows you to find a good minimum of E(x) whereas sampling alone doesn't.

The inventor Tucci first published a description of this invention on Oct. 9, 2009, in Ref.TucQuibbs1. Later, he added further details in Ref.TucAfga and Ref.TucQuibbs2.

BRIEF SUMMARY OF THE INVENTION

A preferred embodiment of the invention is Quibbs, a computer program written in Java. Source code for Quibbs1.4 is included with this patent. Quibbs is a "code generator" for quantum sampling: after the user inputs some files that specify a classical Bayesian network, Quibbs outputs a quantum circuit for sampling, using a quantum computer, the probability distribution which characterizes the Bayesian network.

BRIEF DESCRIPTION OF THE DRAWINGS

FIG. 2 shows the quantum circuit generated by Quibbs.

FIG. 3 shows insides of parts in FIG. 2

FIG. 4 shows insides of parts in FIG. 3

FIG. 5 shows insides of parts in FIG. 4

FIG. 9 shows a Probabilities File for a Bayesian net with Parents File given by FIG. 7 and States File given by FIG. 8.

FIG. 10 shows an example of a Log File.

FIG. 11 shows an example of an English File.

FIG. 12 shows an example of a Picture File.

DETAILED DESCRIPTION OF THE INVENTION

This section describes in detail a preferred embodiment of the invention called Quibbs and other possible embodiments of the invention.

Quibbs is a computer program written in Java. Source code for Quibbs1.4 is included with this patent. Quibbs is a "code generator" for quantum sampling: after the user inputs some files that specify a classical Bayesian network, Quibbs outputs a quantum circuit for sampling, using a quantum computer, the probability distribution which characterizes the Bayesian network.

The Bayesian network being considered will be characterized by a random variable x that can take on values in a set val(x) and has a full probability distribution $P_x(\ )$. (val(x) is often called the sample space of x). If the Bayesian network has $N_{nds}$ nodes, then $\underline{x}=(x_1, x_2, \ldots, x_{N_{nds}})$, where random variable $x_j \in val(x_j)$ corresponds to the j'th node. Without loss of generality, we will take $val(x_j) = \{0,1\}^{N_{Bj}}$ for some positive integer $N_{Bj}$, and $val(\underline{x}) = \{0,1\}^{N_B}$, where $N_B = \Sigma_j N_{Bj}$.

Henceforth we will say $|v\rangle$ is a unit vector if $\langle v|v\rangle = 1$. Consider two unit vectors $|v_1\rangle$ and $|v_2\rangle$ and let $D = ||v_1\rangle - |v_2\rangle|^2$. We will say that $|v_1\rangle$ and $|v_2\rangle$ are approximately equal to each other if D is significantly smaller than one. We will say that they are equal if D=0. We will say that $|v_1\rangle$ and $|v_2\rangle$ are equal (respectively, approximately equal) up to a phase factor if there is some real number α such that $|v_1\rangle$ and $e^{i\alpha}|v_2\rangle$ are equal (respectively, approximately equal). We will say that $|v_1\rangle$ is an approximate eigenvector of an operator Ω if there exist a vector $|v_2\rangle$ which is an eigenvector of Ω and $|v_1\rangle$ is approximately equal to $|v_2\rangle$.

Henceforth, we will use the acronym AFGA (Adaptive Fixed-point Grover's Algorithm) for the algorithm described in Ref.TucAfga.

Consider any operator of the form $\Omega = \exp(i\alpha|v\rangle\langle v|)$ where α is a real number and where $|v\rangle$ is a unit vector. Note that Ω has only two distinct eigenvalues, namely exp(iα) and 1. In fact, $|v\rangle$ is an eigenvector of Ω with eigenvalue exp(iα), whereas any vector orthogonal to $|v\rangle$ has eigenvalue 1. The original Grover's algorithm (the one in Ref.GWiki) uses operators of the form Ω, with α equal to π or −π. Grover's pi/3 algorithm (the one in Ref.GPi/3) uses operators of the form Ω, with α equal to π/3 or −π/3. AFGA, on the other hand, uses operators of the form Ω, with α equal to $\alpha_j$ or Δλ where $\alpha_j$ tends to zero as j tends to infinity.

Figure 1:
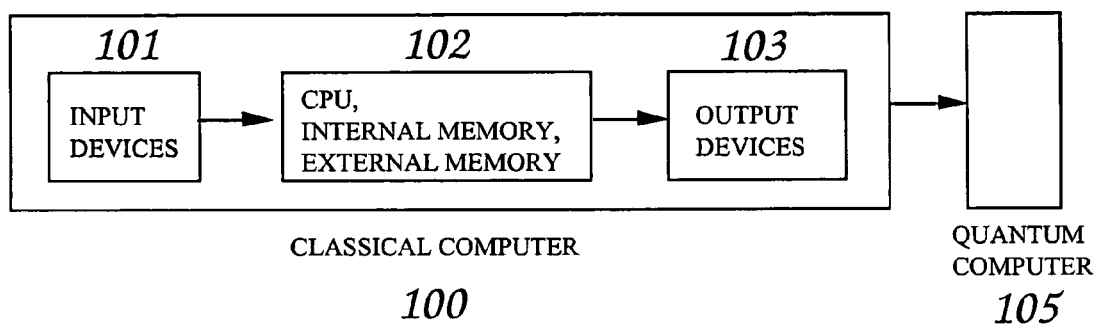
FIG. 1 shows a block diagram of a classical computer feeding data to a quantum computer.

FIG. 1 is a block diagram of a classical computer feeding data to a quantum computer. Box 100 represents a classical computer. Quibbs1.4 software runs inside Box 100. Box 100 comprises sub-boxes 101, 102, 103. Box 101 represents input devices, such as a mouse or a keyboard. Box 102 comprises the CPU, internal and external memory units. Box 102 does calculations and stores information. Box 103 represents output devices, such as a printer or a display screen. The inputs and outputs of Quibbs can be rendered on the display screen. Box 105 represents a quantum computer, comprising an array of quantum bits and some hardware for manipulating the state of those bits.

The remainder of this section is divided into 3 subsections. Subsection (A) describes the quantum circuit generated by Quibbs. Subsection (B) describes Quibbs' user interface. Subsection (C) discusses other possible embodiments of the invention.

(A) Quibbs: Quantum Circuit

In this section, we describe the quantum circuit generated by Quibbs. For a more detailed description of the circuit, see Ref.TucQuibbs1 and Ref.TucAfga.

201 in FIG. 2 is the quantum circuit generated by Quibbs. Let a, c, $N_B$ and $N_{ste}$ be some positive integers, and let $x_0$ be an element of $\{0,1\}^{N_B}$. Circuit 201 operates on $ac+2N_B$ qubits. Circuit 201 starts off in an initial state which is a tensor product state of the $ac+2N_B$ qubits, with the top $ac+N_B$ qubits in state $|0\rangle$ and the bottom $N_B$ qubits in state $|x_0\rangle$. This initial state is then subjected to $N_{ste}+1$ operators ("ste" stands for step). We will next proceed to describe the nature of each of these $N_{ste}+1$ operators.

Each of the boxes in circuit 201 is a product of two operators, $\tilde{R}_{beg}^{(j)}$ and $\tilde{R}_{tar}$. "beg" stands for "beginning" and "tar" for "target". Note that $\tilde{R}_{beg}^{(j)}$ depends on the step number j (an integer which ranges from 0 to $N_{ste}$), whereas $\tilde{R}_{tar}$ doesn't depend on it. According to equation 202, even though $\tilde{R}_{beg}^{(j)}$ acts on all the $ac+2N_B$ qubits, it can be expressed exactly as operator which acts as the identity on the top ac qubits and another operator $R_{beg}^{(j)}$ which acts only on the bottom $2N_B$ qubits. FIG. 3, which will be discussed in more detail later, gives an exact circuit equivalent, namely circuit 301, for $\tilde{R}_{tar}$. We see that $\tilde{R}_{tar}$ cannot be expressed exactly in terms of an operator which acts as the identity on the top ac qubits. However, according to equation 203, $\tilde{R}_{tar}$ can be approximated by an operator which acts as the identity on the top ac qubits and another operator $\tilde{R}_{tar}$ which acts only on the bottom $2N_B$ qubits.

Let $\Delta\lambda$ be a real number between 0 and $\pi$, and let $\{\alpha_j\}_{j=0}^{\infty}$ be a sequence of real numbers. $\Delta\lambda$ can be selected by the user. Ref.TucAfga explains how to calculate the angles $\alpha_j$ and gives an Octave/Matlab program called afga.m that calculates them explicitly.

Equation 204 defines $R_{beg}^{(j)}$ in terms of the state $|s'\rangle$ and the angles $\alpha_j$. Equation 205 defines $R_{tar}$ in terms of the state $|t\rangle$ and the angle $\Delta\lambda$. State $|s'\rangle$ is defined by equation 206, and state $|t\rangle$ is defined by equation 207. Equation 208 defines the state $|\sqrt{\pi}\rangle$, where $\pi(\ )=P_x(\ )$. Equation 209 stipulates that the state $|FIN\rangle$ defined by Equation 201 must be approximately equal (up to a phase factor $e^{i\alpha}$) to a state which is a tensor product of $|0\rangle$ for each of the top $ac+N_B$ qubits and $|\sqrt{\pi}\rangle$ for the bottom $N_B$ qubits.

$\tilde{R}_{tar}$ is defined exactly by the quantum circuit 301 in FIG. 3. Circuit 301 uses two operators called V and Q. These are defined explicitly by equations 302 and 303. In equation 303, H is the 1-qubit Hadamard matrix. Equation 303 also uses various powers of an operator W that will be defined explicitly in the next figure.

W is a so called Szegedy quantum walk operator. Equation 401 in FIG. 4 defines W in terms of operators U, $\hat{\pi}$ and $\tilde{\pi}$. The projection operators $\hat{\pi}$ and $\tilde{\pi}$ are defined by equations 402 and 403, respectively. The operator U can be defined in various ways, as long as it satisfies equation 404. One particular way of defining U is described in Ref.TucQuibbs1, and implemented explicitly in the Quibbs source code included with this patent. But what are the eigenvectors $|m_j\rangle$ and eigenvalues $m_j$ alluded to in equation 404? As stated in equation 405, they are the eigenvectors and eigenvalues of an operator $M_{hyb}$ that will be defined in the next figure.

Equation 501 in FIG. 5 defines the operator $M_{hyb}$. ("hyb" stands for "hybrid"). Equation 501 uses two operators called $\Lambda_1$ and $\Lambda_2$. The matrix elements of $\Lambda_1$ and $\Lambda_2$ are defined by equation 502, in terms of the matrix elements of two operators called $M_1$ and $M_2$. The matrix elements of $M_1$ and $M_2$ are defined in terms of certain conditional probabilities of $P_x(x)$. Suppose $x=(x_1, x_2, \ldots, x_{N_{nds}})$. When $N_{nds}=3$, the matrix elements of $M_1$ and $M_2$ are defined by equations 503 and 504. For arbitrary $N_{nds}$, the matrix elements of $M_1$ and $M_2$ are defined using the same pattern as in this $N_{nds}=3$ example.

(B) Quibbs: User Interface

In this section, we describe Quibbs' user interface. For more a more detailed description of the interface, see Ref.TucQuibbs2.

(B1) The Control Panel

Figure 6:
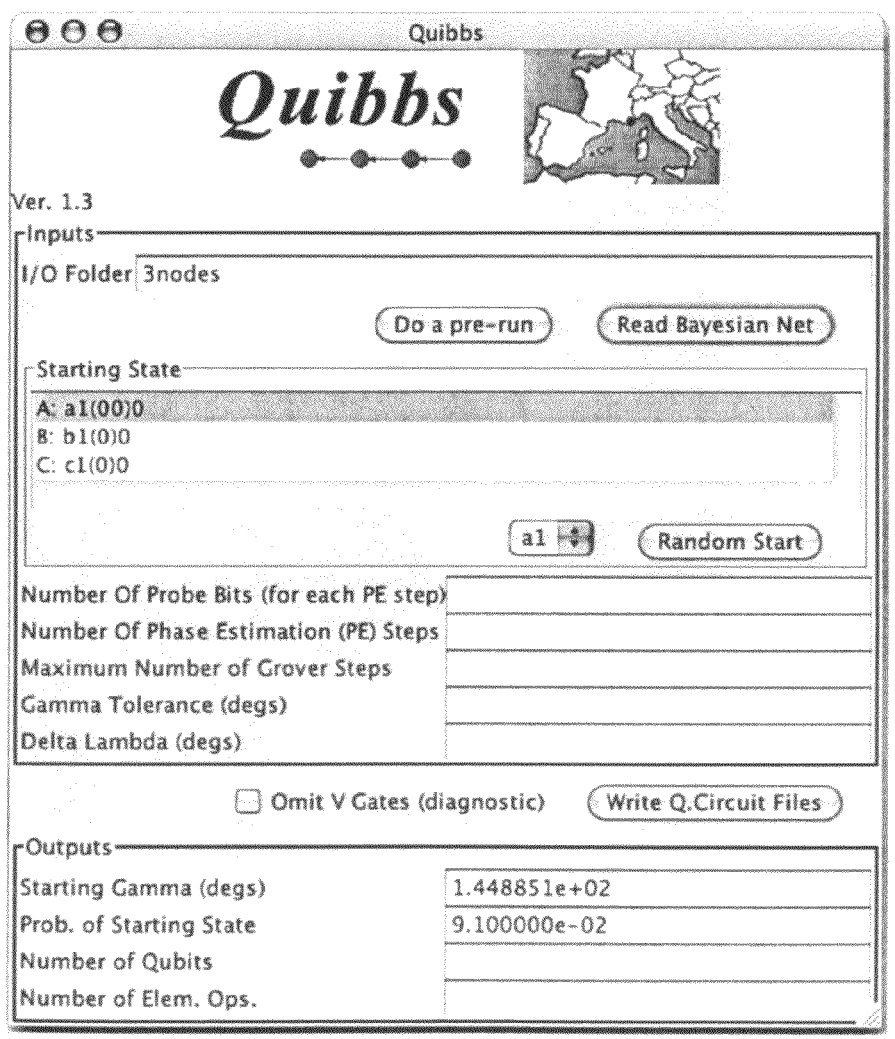
FIG. 6 shows Control Panel of Quibbs.

FIG. 6 shows the Control Panel for Quibbs. This is the main and only window of Quibbs (except for the occasional error message window). This window is open if and only if Quibbs is running.

The Control Panel allows the user to enter the following inputs:

I/O Folder: The user enters in this text box the name of a folder. The folder will contain Quibbs' input and output files for the particular Bayesian network that the user is currently considering.

To generate a quantum circuit, the I/O folder must contain the following 3 input files:

(In1) parents.txt
(In2) states.txt
(In3) probs.txt

Examples of In1, In2 and In3 will be presented later. For this section, all the reader needs to know is that: The parents.txt file lists the parent nodes of each node of the Bayesian net being considered. The states.txt file lists the names of the states of each node of the Bayesian net. And the probs.txt file gives the probability matrix for each node of the Bayesian net. Together, the In1, In2 and In3 files fully specify the Bayesian network being considered.

In the example of FIG. 6, "3nodes" is entered in the I/O Folder text box. A folder called "3nodes" comes with the distribution of Quibbs. It contains, among other things, In1, In2, In3 files that specify one possible Bayesian network with 3 nodes.

When the user presses the Read Bayesian Net button, Quibbs reads files In1, In2 and In3. The program then creates data structures that contain complete information about the Bayesian network. Furthermore, Quibbs fills the scrollable list in the Starting State grouping with information that specifies "the starting state". The starting state is one particular instantiation (i.e., a particular state for each node) of the Bayesian network x. The point $x_0$ introduced before can be calculated from the starting state. Each row of the scrollable list names a different node, and a particular state of that node. For example, FIG. 6 shows the Quibbs Control Panel immediately after pressing the Read Bayesian Net button. In this example, the Bayesian net read in has 3 nodes called A, B and C, and the starting state has node A in state a1, node B in state b1 and node C in state c1.

If the user presses the Random Start button, the starting state inside the scrollable list is changed to a randomly generated one. Alternative, the user can choose a specific state for each node of the Bayesian net by using the Node State Menu, the menu immediately to the left of the Random Start button.

Number of Probe Bits (for each PE step): This is the parameter $a=1,2,3,\ldots$ for the operator V.

Number of Phase Estimation (PE) Steps: This is the parameter $c=1,2,3,\ldots$ : for the operator V.

Maximum Number of Grover Steps: Quibbs will stop iterating the AFGA if it reaches this number of iterations.

Gamma Tolerance (degs): This is an angle given in degrees. Quibbs will stop iterating the AFGA if the absolute value of $\gamma_j$ becomes smaller than this tolerance. ($\gamma_j$ is an angle in AFGA that tends to zero as the step index j tends to infinity. $\gamma_j$ quantifies how close the AFGA is to reaching the target state).

Delta Lambda (degs): This is the angle $\Delta\lambda$ of AFGA, given in degrees.

Once Quibbs has successfully read files In1, In2 and In3, and once the user has filled all the text boxes in the Inputs grouping, the user can successfully press the Write Q. Circuit Files button. This will cause Quibbs to write the following output files within the I/O folder:

(Out1) quibbs_log.txt
(Out2) quibbs_eng.txt
(Out3) quibbs_pic.txt

Examples of these 3 output files will be given later. For now, all the reader needs to know is that: The quibbs_log.txt file records all the input and output parameters that the user entered into the Control Panel, so the user won't forget them. The quibbs_eng.txt file is an "in English" description of a quantum circuit. And the quibbs_pic.txt file translates, line for line, the English description found in quibbs_eng.txt into a "pictorial" description.

The Control Panel displays the following output text boxes. (The Starting Gamma (degs) output text box and the Prob. of Starting State output text box are both filled as soon as a starting state is given in the inputs. The other output text boxes are filled when the user presses the Write Q. Circuit Files button.)

Starting Gamma (degs): This is $\gamma \in [0,\pi]$, defined to satisfy $\cos(\gamma/2) = \langle s'|t\rangle = \sqrt{P_x(x_0)}$, where $P_x(x_0)$ is called the Prob. of Starting State.

Prob. of Starting State: This is the probability $P_x(x_0)$, which must be nonzero for AFGA to work. The probability distribution $P_x(\ )$, and point $x_0$ were introduced before.

Number of Qubits: This is the total number of qubits used by the quantum circuit, equal to $ac+2N_B$.

Number of Elementary Operations: This is the number of elementary operations in the output quantum circuit.

(B2) Input Files

As explained earlier, for Quibbs to generate quantum circuit files, it needs to first read 3 input files: the Parents File called parents.txt, the States File called states.txt, and the Probabilities File called probs.txt. These 3 input files must be placed inside the I/O folder. Next we give examples of these 3 input files.

Figure 7:
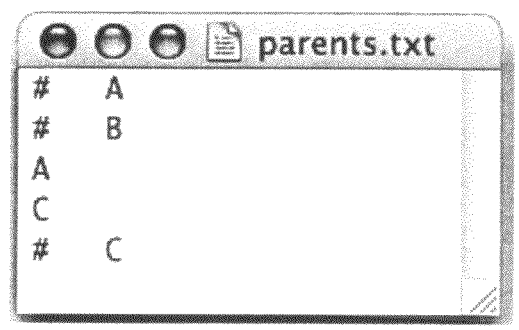
FIG. 7 shows the Parents File for a Bayesian net with graph A→B←C.

FIG. 7 shows the Parents File for a Bayesian net with graph A→B←C. In this example, nodes A and C have no parents and node B has parents A and C.

Figure 8:
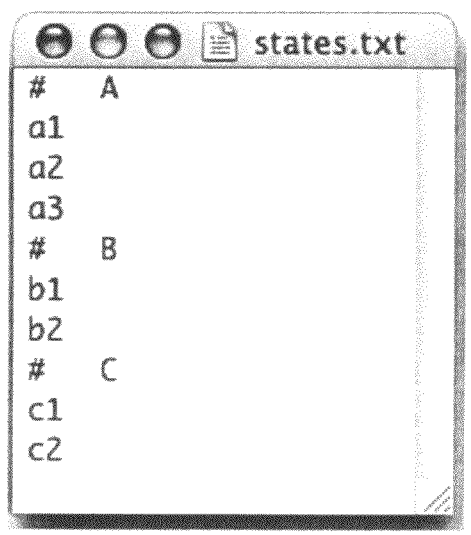
FIG. 8 shows a States File for a Bayesian net with 3 nodes called A, B and C.

FIG. 8 shows a States File for a Bayesian net with 3 nodes called A, B and C. In this example, node A has 3 states called a1, a2 and a3, node B has 2 states called b1 and b2, and node C has 2 states called c1 and c2.

FIG. 9 shows a Probabilities File for a Bayesian net with Parents File given by FIG. 7 and States File given by FIG. 8. In this example, $P_A(a1)=0.2$, $P_{B|A,C}(b1|a1,c1)=0.7$, etc.

(B3) Output Files

As explained earlier, when the user presses the Write Q. Circuit Files button, Quibbs writes 3 output files within the I/O folder: a Log File called quibbs_log.txt, an English File called quibbs_eng.txt, and a Picture File called quibbs_pic.txt. Next we give examples of these 3 output files.

FIG. 10 is an example a Log File. A Log File records all the information found in the Control Panel.

FIG. 11 is an example of an English File. An English File completely specifies the output SEO. It does so "in English", thus its name. Each line represents one elementary operation, and time increases as we move downwards. Ref.TucQuibbs2 explains in detail how to interpret an English File.

FIG. 12 is an example of a Picture File. A Picture File partially specifies the output SEO. It gives an ASCII picture of the quantum circuit. Each line represents one elementary operation, and time increases as we move downwards. There is a one-to-one onto correspondence between the rows of the English and Picture Files. Ref.TucQuibbs2 explains in detail how to interpret a Picture File.

(C) Other Embodiments

In this section, we describe other possible embodiments of the invention.

Of course, Quibbs could have been written in a computer language other than Java.

The quantum circuit generated by Quibbs includes some quantum multiplexors. The Java application Multiplexor Expander (see Ref.TucQusann) allows the user to replace each of those multiplexors by a sequence of more elementary gates such as multiply controlled NOTs and qubit rotations. Multiplexor Expander source code is included with this patent. Another perhaps more efficient variation would be if Quibbs didn't write a given multiplexor in the English File, but rather wrote instead a SEO that was either exactly or approximately equal to the multiplexor.

The quantum circuit generated by Quibbs includes some multiply controlled NOTs. The Java application MultiCNot Expander, whose source code is included with this patent, allows the user to replace each of those multiply controlled NOTs by a sequence of more elementary gates such as singly controlled NOTs and qubit rotations.

A version of Quibbs could forgo writing the English or Picture Files and feed the SEO directly to the quantum computer.

So far, we have described some exemplary preferred embodiments of this invention. Those skilled in the art will be able to come up with many modifications to the given embodiments without departing from the present invention. Thus, the inventor wishes that the scope of this invention be determined by the appended claims and their legal equivalents, rather than by the given embodiments.

I claim:

1. A method of operating a classical computer to calculate a total SEO, with the purpose of using said total SEO to operate a quantum computer, and to induce said quantum computer to approximately sample a probability distribution $\pi(x)$ defined for all $x \in \{0,1\}^{N_B}$, said method comprising the steps of:

storing in said classical computer a data trove comprising a positive number $\epsilon$, a point $x_0 \in \{0,1\}^{N_B}$ such that $\pi(x_0)$ is nonzero, and a data-set that specifies said probability distribution $\pi(x)$, calculating using said classical computer and using said data trove, a sequence of unitary operators $U_0, U_1, U_2, \ldots, U_M$, wherein M depends on $\epsilon$, wherein there are unit vectors $|\Phi_1\rangle$ and $|\Phi_2(x)\rangle$ such that if ERR= $\||v_1\rangle - |v_2\rangle\|^2$ where $|v_1\rangle = U_M \ldots U_1 U_0 |x_0\rangle \otimes |\Phi_1\rangle$ and $|v_2\rangle = \Sigma_x \sqrt{\pi(x)} |x\rangle \otimes |\Phi_2(x)\rangle$, then ERR$\leq \epsilon$, calculating using said classical computer for each $j=0,1,2,\ldots M$, a SEO $\Sigma_j$ corresponding to $U_j$, wherein said total SEO equals the product $\Sigma_M \ldots \Sigma_1 \Sigma_0$.

2. The method of claim 1, wherein said data trove comprises a net data-set that specifies a Bayesian network with full probability distribution equal to said $\pi(x)$, wherein said net data-set comprises:

(a) a data-set that characterizes the possible states of each node of said Bayesian network, (b) a data-set that characterizes the parent nodes of each node of said Bayesian network, (c) a data-set that characterizes a multiplicity of conditional probabilities associated with each node of said Bayesian network.

3. The method of claim 1, wherein if A is the subset of $\{0,1,2,\ldots M\}$ such that for all j in A, $U_j$ has only two distinct eigenvalues $\lambda_{1j}$ and $\lambda_{2j}$ such that the product $\lambda_{1j}\lambda_{2j}^*$ is not in the set $\{e^{i\pi/3}, e^{-i\pi/3}, -1\}$, then A has 3 or more elements.

4. The method of claim 3, wherein A has about M elements.

5. The method of claim 1, wherein for each j=0,1,2,...M, said SEO $\Sigma_j$ has a number of elementary operations that scales polynomially in $N_B$.

6. The method of claim 1, further utilizing a quantum computer, comprising the additional step of:
   operating said quantum computer according to said total SEO.

7. The method of claim 1, wherein said sequence of unitary operators $U_0, U_1, \ldots U_M$ alternates between unitary operators that have $|x\rangle \otimes |\alpha\rangle$ for some state $|\alpha\rangle$, as an approximate eigenvector, and unitary operators that have $\Sigma_x \sqrt{\pi(x)}|x\rangle \otimes |\beta\rangle$ for some state $|\beta\rangle$, as an approximate eigenvector.

8. A device that calculates a total SEO, with the purpose of using said total SEO to operate a quantum computer, and to induce said quantum computer to approximately sample a probability distribution $\pi(x)$ defined for all $x \in \{0,1\}^{N_B}$, said device comprising:
   a memory arranged to store a data trove comprising a positive number $\epsilon$, a point $x_0 \in \{0,1\}^{N_B}$ such that $\pi(x_0)$ is nonzero, and a data-set that specifies said probability distribution $\pi(x)$,
   a processor arranged to calculate using said data trove stored in said memory, a sequence of unitary operators $U_0, U_1, U_2, \ldots, U_M$, wherein M depends on $\epsilon$, and arranged to calculate for each j=0,1,2,...M, a SEO $\Sigma_j$ corresponding to $U_j$, wherein there are unit vectors $|\Phi_1\rangle$ and $|\Phi_2(x)\rangle$ such that if ERR=$\||v_1\rangle - |v_2\rangle\|^2$ where $|v_1\rangle = U_M \ldots U_1 U_0 |x_0\rangle \otimes |\Phi_1\rangle$ and $|v_2\rangle = \Sigma_x \sqrt{\pi(x)}|x\rangle \otimes |\Phi_2(x)\rangle$, then ERR $\leq \epsilon$, wherein said total SEO equals the product $\Sigma_M \ldots \Sigma_1 \Sigma_0$.

9. The device of claim 8, wherein said data trove comprises a net data-set that specifies a Bayesian network with full probability distribution equal to said $\pi(x)$, wherein said net data-set comprises:
   (a) a data-set that characterizes the possible states of each node of said Bayesian network,
   (b) a data-set that characterizes the parent nodes of each node of said Bayesian network,
   (c) a data-set that characterizes a multiplicity of conditonal probabilities associated with each node of said Bayesian network.

10. The device of claim 8, wherein if A is the subset of $\{0,1,2,\ldots M\}$ such that for all j in A, $U_j$ has only two distinct eigenvalues $\lambda_{1j}$ and $\lambda_{2j}$ such that the product $\lambda_{1j}\lambda_{2j}8$ is not in the set $\{e^{i\pi/3}, e^{-i\pi/3}, -1\}$, then A has 3 or more elements.

11. The device of claim 10, wherein A has about M elements.

12. The device of claim 8, further comprising a quantum computer that operates according to said total SEO.

13. The device of claim 8, wherein said sequence of unitary operators $U_0, U_1, \ldots U_M$ alternates between unitary operators that have $|x\rangle \otimes |\alpha\rangle$ for some state $|\alpha\rangle$, as an approximate eigenvector, and unitary operators that have $\Sigma_x \sqrt{\pi(x)}|x\rangle \otimes |\beta\rangle$ for some state $|\beta\rangle$, as an approximate eigenvector.

14. A method of operating a classical computer to calculate a total SEO, with the purpose of using said total SEO to operate a quantum computer, and to induce said quantum computer to approximately sample a probability distribution $\pi(x)$ defined for all $x \in \{0,1\}^{N_B}$, said method comprising the steps of:
   storing in said classical computer a data trove comprising a positive number $\epsilon$, and a data-set that specifies a multiplicity of conditional probabilities of said $\pi(x)$,
   calculating using said classical computer and using said data trove, a sequence of unitary operators $U_0, U_1, U_2, \ldots, U_M$, wherein M depends on $\epsilon$, wherein there are unit vectors $|\Phi_1\rangle$ and $|\Phi_2(x)\rangle$ such that if ERR=$\||v_1\rangle - |v_2\rangle\|^2$ where $|v_1\rangle = U_M \ldots U_1 U_0 |\Phi_1\rangle$ and $|v_2\rangle = \Sigma_x \sqrt{\pi(x)}|x\rangle \otimes |\Phi_2(x)\rangle$, then ERR $\leq \epsilon$,
   calculating using said classical computer for each j=0,1,2,...M, a SEO $\Sigma_j$ corresponding to $U_j$, wherein said total SEO equals the product $\Sigma_M \ldots \Sigma_1 \Sigma_0$.

15. The method of claim 14, wherein if A is the subset of $\{0,1,2,\ldots M\}$ such that for all j in A, $U_j$ has only two distinct eigenvalues $\lambda_{1j}$ and $\lambda_{2j}$ such that the product $\lambda_{1j}\lambda_{2j}^*$ is not in the set $\{e^{i\pi/3}, e^{-i\pi/3}, -1\}$, then A has 3 or more elements.

16. The method of claim 15, wherein A has about M elements.

17. The method of claim 14, wherein for each j=0,1,2,...M, said SEO $\Sigma_j$ has a number of elementary operations that scales polynomially in $N_B$.

18. The method of claim 14, further utilizing a quantum computer, comprising the additional step of:
   operating said quantum computer according to said total SEO.

19. The method of claim 14, wherein said sequence of unitary operators $U_0, U_1, \ldots U_M$ alternates between unitary operators that have $|x\rangle \otimes |\alpha\rangle$ for some state $|\alpha\rangle$, as an approximate eigenvector, and unitary operators that have $\Sigma_x \sqrt{\pi(x)}|x\rangle \otimes |\beta\rangle$ for some state $|\beta\rangle$, as an approximate eigenvector.

20. A device that calculates a total SEO, with the purpose of using said total SEO to operate a quantum computer, and to induce said quantum computer to approximately sample a probability distribution $\pi(x)$ defined for all $x \in \{0,1\}^{N_B}$ said device comprising:
   a memory arranged to store a data trove comprising a positive number $\epsilon$, and a data-set that specifies a multiplicity of conditional probabilities of said $\pi(x)$,
   a processor arranged to calculate using said data trove stored in said memory, a sequence of unitary operators $U_0, U_1, U_2, \ldots, U_M$, wherein M depends on $\epsilon$, and arranged to calculate for each j=0,1,2,...M, a SEO $\Sigma_j$ corresponding to $U_j$, wherein said total SEO equals the product $\Sigma_M \ldots \Sigma_1 \Sigma_0$, wherein there are unit vectors $|\Phi_1\rangle$ and $|\Phi_2(x)\rangle$ such that if ERR=$\||v_1\rangle - |v_2\rangle\|^2$ where $|v_1\rangle = U_M \ldots U_1 U_0 |\Phi_1\rangle$ and $|v_2\rangle = \Sigma_x \sqrt{\pi(x)}|x\rangle \otimes |\Phi_2(x)\rangle$, then ERR $\leq \epsilon$.

21. The device of claim 20, wherein if A is the subset of $\{0,1,2,\ldots M\}$ such that for all j in A, $U_j$ has only two distinct eigenvalues $\lambda_{1j}$ and $\lambda_{2j}$ such that the product $\lambda_{1j}\lambda_{2j}^*$ is not in the set $\{e^{i\pi/3}, e^{-i\pi/3}, -1\}$, then A has 3 or more elements.

22. The device of claim 21, wherein A has about M elements.

23. The device of claim 20, wherein for each j=0,1,2,...M, said SEO $\Sigma_j$ has a number of elementary operations that scales polynomially in $N_B$.

24. The device of claim 20, further comprising a quantum computer that operates according to said total SEO.

25. The device of claim 20, wherein said sequence of unitary operators $U_0, U_1, \ldots U_M$ alternates between unitary operators that have $|x\rangle \otimes |\alpha\rangle$ for some state $|\alpha\rangle$, as an approximate eigenvector, and unitary operators that have $\Sigma_x \sqrt{\pi(x)}|x\rangle \otimes |\beta\rangle$ for some state $|\beta\rangle$, as an approximate eigenvector.

* * * * *